United States Patent
Yilma et al.

(10) Patent No.: US 9,914,384 B2
(45) Date of Patent: Mar. 13, 2018

(54) MULTIFUNCTION TONNEAU COVER FOR A LOAD BED OF A TRUCK

(71) Applicant: FORD GLOBAL TECHNOLOGIES, LLC, Dearborn, MI (US)

(72) Inventors: Benjamin Yilma, Canton, MI (US); Pattrick Loew, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/170,447

(22) Filed: Jun. 1, 2016

(65) Prior Publication Data
US 2017/0349081 A1   Dec. 7, 2017

(51) Int. Cl.
*B60P 7/02* (2006.01)
*B60P 7/08* (2006.01)

(52) U.S. Cl.
CPC .. *B60P 7/02* (2013.01); *B60P 7/08* (2013.01)

(58) Field of Classification Search
CPC ........................................................ B60P 7/02
USPC ....... 296/100.02, 100.06, 100.07; 108/44, 49
See application file for complete search history.

(56) References Cited

U.S. PATENT DOCUMENTS

| | | |
|---|---|---|
| 4,550,945 A | 11/1985 | Englehardt |
| 4,824,163 A | 4/1989 | Hendrych |
| 5,090,335 A | 2/1992 | Russell |
| 5,239,934 A | 8/1993 | Miller et al. |
| 6,533,344 B1 | 3/2003 | Patterson |
| 2009/0314187 A1 | 12/2009 | Miller |

*Primary Examiner* — Dennis H Pedder
(74) *Attorney, Agent, or Firm* — Jason Rogers; King & Schickli, PLLC

(57) ABSTRACT

A multifunction tonneau cover is provided for a load bed of a truck. That multifunction tonneau cover includes a body having a plurality of leg receivers and a plurality of caps closing the leg receivers in a first mode of operation as a load bed cover. In addition, the multifunction tonneau cover includes a plurality of legs that are received and held in the plurality of receivers and a second mode of operation as a table.

15 Claims, 8 Drawing Sheets

MULTIFUNCTION TONNEAU COVER FOR A LOAD BED OF A TRUCK

TECHNICAL FIELD

This document relates generally to the motor vehicle equipment field and, more particularly, to a multifunction tonneau cover that may be removed from the pickup truck and converted to a work table and then converted back to a tonneau cover for the pickup truck once work is completed. Advantageously, the tonneau cover may be converted back and forth between functions in a convenient and efficient manner. Further, the exposed finish of the upper surface of the tonneau cover is protected from damage when the tonneau cover is used as a table.

BACKGROUND

Most job sites are devoid of working surfaces and in the past it has been necessary to load saw-horses or work tables into the load bed of a pickup truck to address this need. Unfortunately, sawhorses and work tables occupy some of the space in the load bed effectively eliminating the use of that space to carry other needed cargo items.

This document relates to a multifunction tonneau cover for the load bed of a truck, such as a pickup truck, that may function as an on-site work table. Advantageously, the tonneau cover may be converted back and forth between the tonneau cover function and the work table function in a quick and efficient manner. Further, it should be appreciated that the tonneau cover is flipped over when utilized as a work table so that the finish of the upper face is protected from scratches and damage when the tonneau cover is functioning as a work table. Since the tonneau cover functions as a very effective work table, it eliminates the need to carry a work table in the load bed thereby freeing that load bed space for other needed cargo.

SUMMARY

In accordance with the purposes and benefits described herein, a multifunction tonneau cover is provided for a load bed of a truck. That multifunction tonneau cover comprises a body including a plurality of leg receivers, a plurality of caps closing the leg receivers in a first mode of operation as a load bed cover and a plurality of legs received and held in the plurality of receivers in a second mode of operation as a work table.

The body may also include a first face oriented upward in the first mode of operation and a second face oriented upward in a second mode of operation. The first face may be opposite the second face.

The tonneau cover may also include a plurality of storage pockets wherein the plurality of legs are received, held and stowed in the plurality of pockets in the first mode of operation. In some embodiments the plurality of storage pockets are provided in the second face of the tonneau cover.

The body of the tonneau cover may include a cover section and a reinforcement section. The cover section may include a recessed wall forming a cavity and the reinforcement may nest within that cavity. In such an embodiment the cover section defines the first face while the reinforcement section defines the second face. In some embodiments the reinforcement section may include at least one reinforcement rib for stiffening the body of the tonneau cover.

Each leg of the plurality of legs may include a tapered end that friction fits in one leg receiver of the plurality of leg receivers.

Each cap of the plurality of caps may be made from a resilient material sized and shaped to plug one leg receiver of the plurality of leg receivers when the tonneau cover is used in its first mode of operation as a load bed cover.

Each leg receiver of the plurality of leg receivers may comprise a raised flange surrounding an opening. In such an embodiment, each cap of the plurality of caps includes a channel for receiving and sealing against the raised flange. In some embodiments, each opening forms a socket having a closed end.

Further, the tonneau cover may include at least one gas strut for supporting the tonneau cover in an open position when utilized in a first mode of operation as a load bed cover. Each gas strut may also include a ball connector and the body may include a socket for releasably receiving the ball connector. Where the tonneau cover includes a body having a cover section and a reinforcement section, the socket may be provided in the reinforcement section. Further, the tonneau cover may include a hinge assembly for pivotally connecting the tonneau cover to the truck. That hinge assembly provides a pivot point for displacing the tonneau cover between open and closed position when used in a first mode of operation as a bed cover.

In the following description, there are shown and described several preferred embodiments of the multifunction tonneau cover. As it should be realized, the multifunction tonneau cover is capable of other, different embodiments and its several details are capable of modification in various, obvious aspects all without departing from the multifunction tonneau cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the multifunction tonneau cover and together with the description serve to explain certain principles thereof. In the drawing figures.

Reference will now be made in detail to the present preferred embodiments of the multifunction tonneau cover, examples of which are illustrated in the accompanying drawing figures.

DETAILED DESCRIPTION

Figure 1:
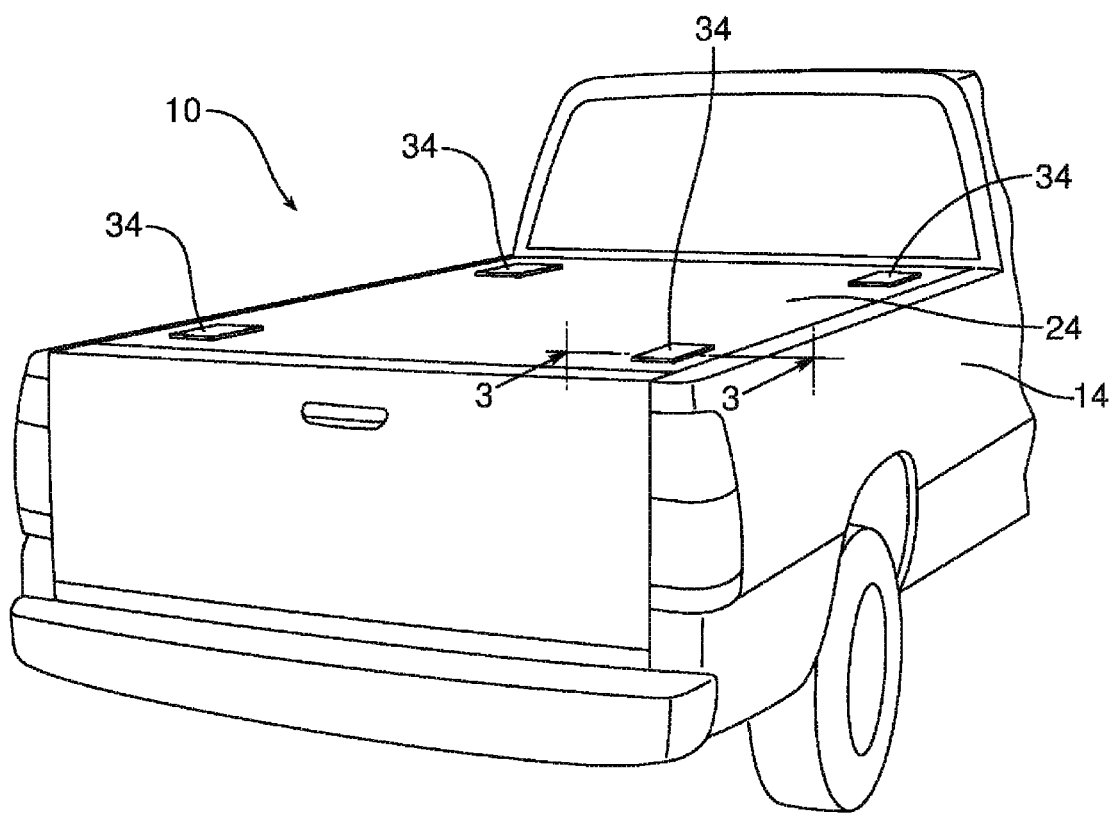
FIG. 1 is a rear perspective view of a pickup truck incorporating the multifunction tonneau cover of the present invention. That multifunction tonneau cover is used in a first mode of operation as a load bed cover and is illustrated in a closed position.
Figure 2:
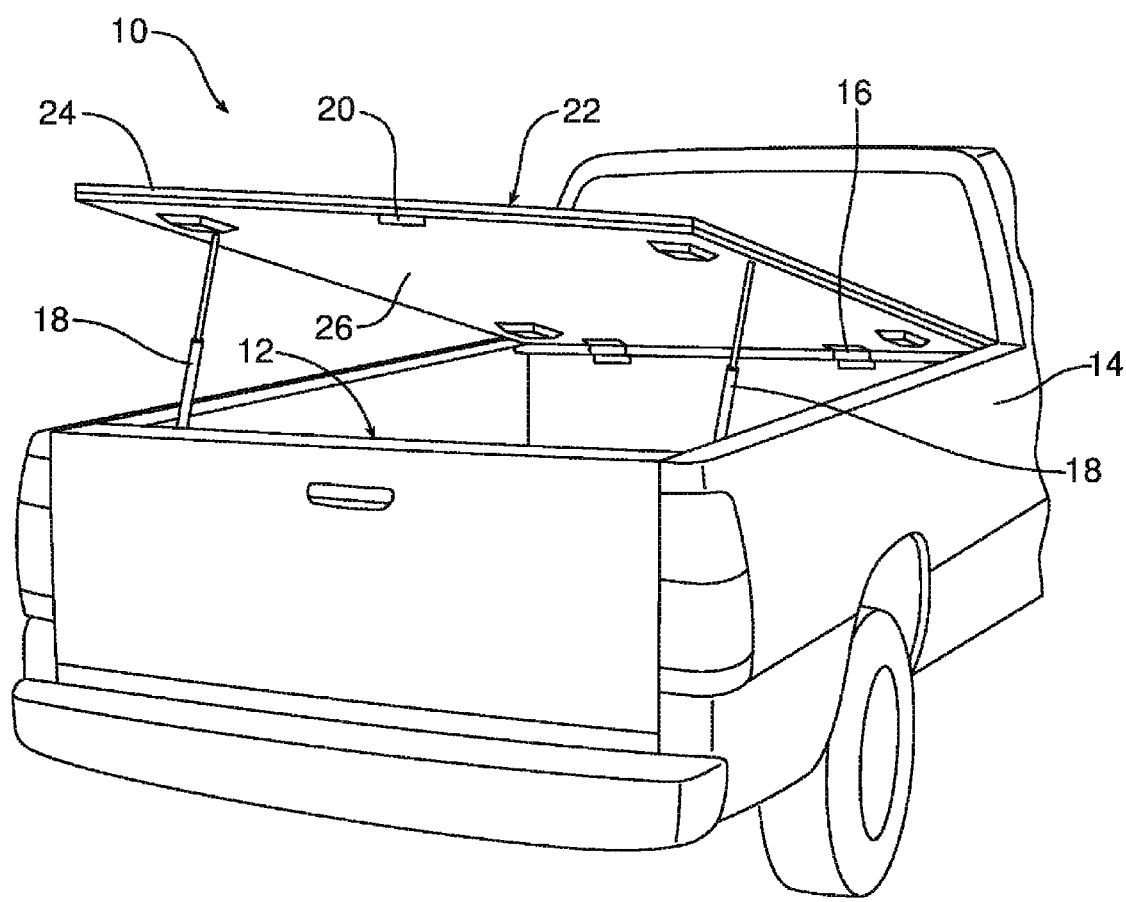
FIG. 2 is a view similar to FIG. 1 but showing the tonneau cover in an open position.

Reference is now made to FIGS. 1 and 2 illustrating the multifunction tonneau cover 10 used in a first mode of operation as a cover for a load bed 12 of a pickup truck 14. FIG. 1 illustrates the tonneau cover 10 in the closed position wherein the cover closes the top of the load bed 12. In contrast, FIG. 2 illustrates the tonneau cover 10 in the first mode of operation as a load bed cover wherein the tonneau cover has been displaced to the open position to allow access to the load bed. As should be appreciated, the tonneau cover 10 pivots at a front end about a hinge assembly 16 when displaced between the closed position and the opened position. Opposed gas struts 18 bias the cover toward and hold the cover in the open position. A latching mechanism, generally designated by reference numeral 20 functions to secure the cover 10 in the closed position.

Figure 3:
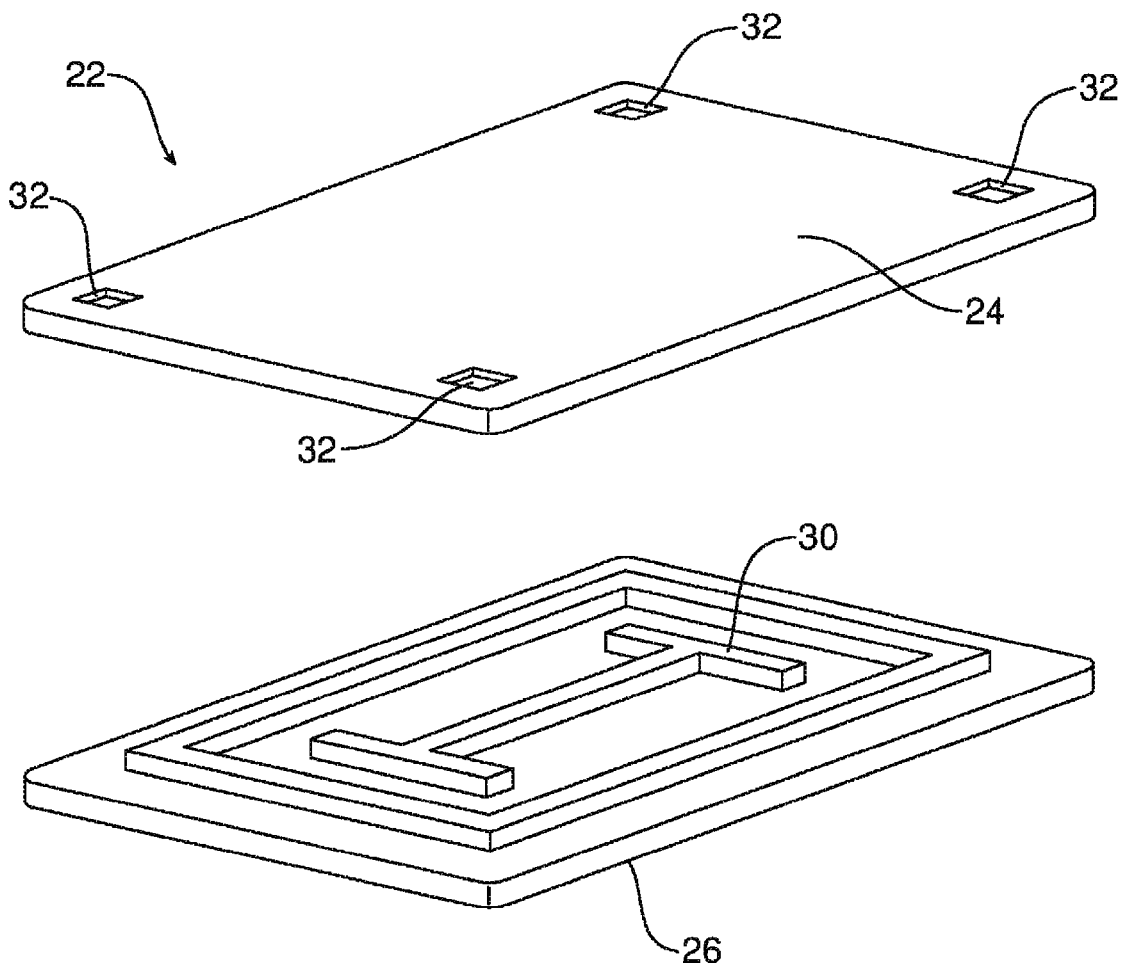
FIG. 3 is an exploded perspective view of the body of the tonneau cover illustrating the cover section and reinforcement section that nest together.

As best illustrated in FIG. 3, the tonneau cover 10 includes a body 22. In the illustrated embodiment, the body 22 comprises a cover section 24 and a reinforcement section 26. More specifically, the cover section 24 includes a cavity and the reinforcement section 26 nests within that cavity. Both the cover section 24 and the reinforcement section 26 may be molded from an appropriate plastic or composite material and it should be appreciated that the reinforcement section 26 may include at least one reinforcement rib 30 to strengthen the body 22.

Figure 4:
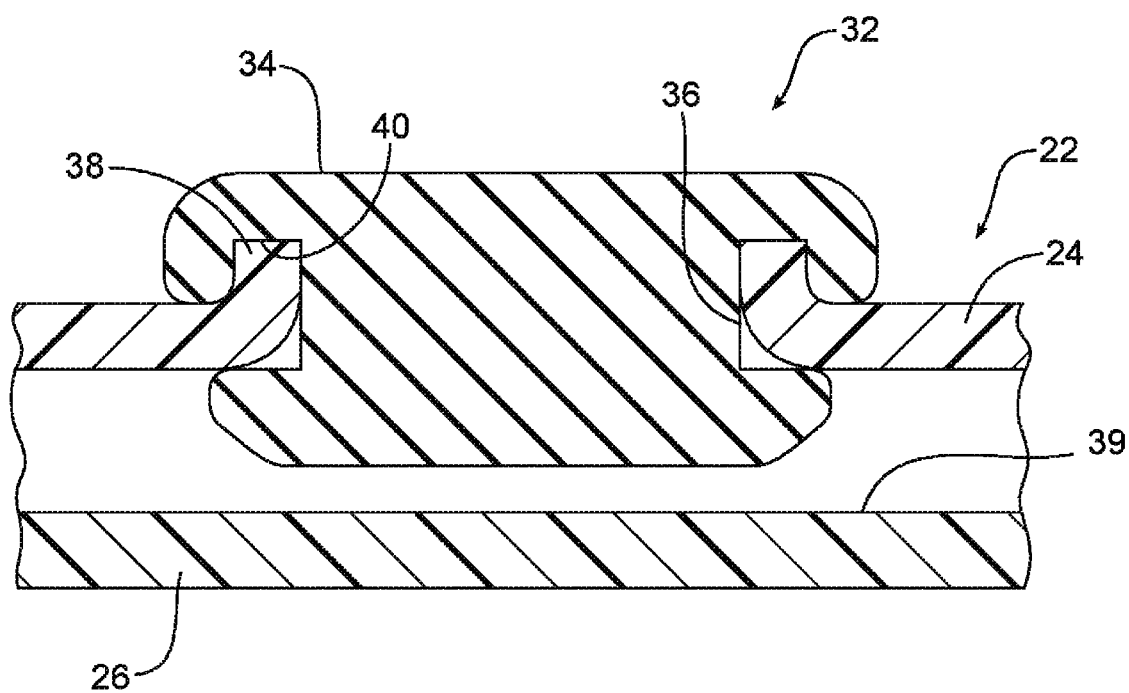
FIG. 4 is a detailed schematic view illustrating how a cap is utilized to close and seal a leg receiver in the tonneau cover when the tonneau cover is utilized in the first mode of operation as a load bed cover.

As best illustrated in FIGS. 1, 3 and 4, the body 22 includes a plurality of leg receivers 32. In the illustrated embodiment, four leg receivers 32 are provided in the cover section 24 of the body. Each leg receiver 32 comprises a socket or closed end aperture with one such receiver being provided adjacent each corner of the body 22.

A plurality of caps 34 are provided for closing the leg receivers 32 when the tonneau cover is used in the first mode of operation as a load bed cover. Each cap 34 may be made from a resilient material, such as a rubber material. Each cap 34 is sized and shaped to plug one leg receiver 32.

In the illustrated embodiment, each receiver 32 includes an opening 36 that is surrounded by a raised flange 38 and has a closed end 39. Each cap 34 includes a channel 40 for receiving and sealing against the raised flange 38. Thus, when the tonneau cover 10 is used in the first mode of operation, it should be appreciated that the caps 34 seal moisture and debris out of the receivers 32.

Figure 5:
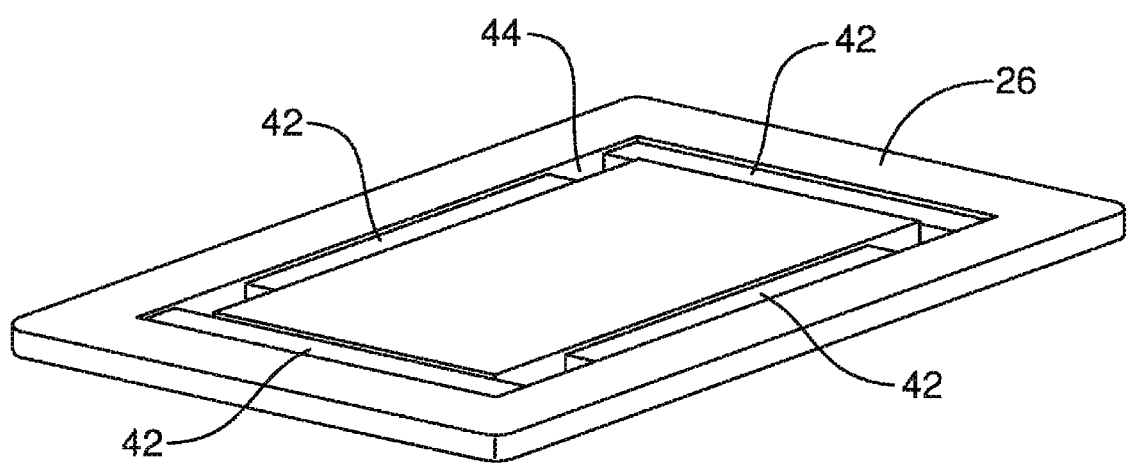
FIG. 5 is a bottom perspective view of the assembled cover showing how the plurality of legs are stored in the storage pockets provided in the second or reverse face of the tonneau cover.
Figure 6:
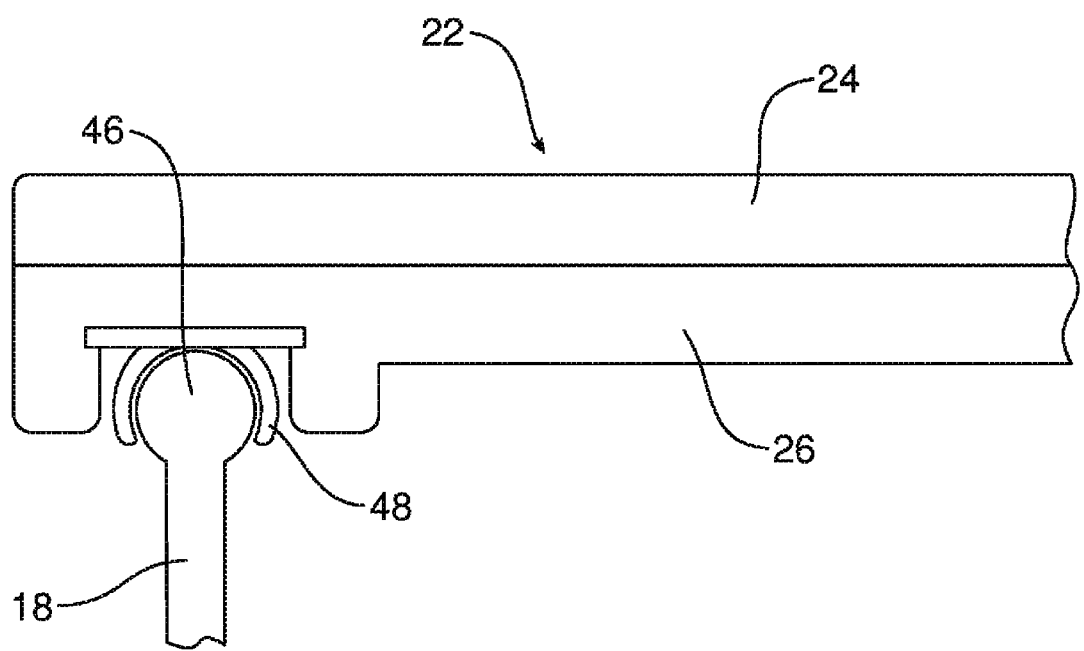
FIG. 6 is a detailed schematic illustration of the ball connector of a gas strut of the tonneau cover received in a socket carried on the body of the tonneau cover.

As illustrated in FIG. 5, the tonneau cover 10 also includes a plurality of legs 42 that are stowed in a plurality of storage pockets 44 when the tonneau cover 10 is being utilized in the first mode of operation as a load bed cover. More specifically, those plurality of storage pockets 44 are provided in the reinforcement section 26 of the body 22 which forms the second or reverse face of the tonneau cover 10. In the illustrated embodiment, the storage pockets 44 are all connected together so as to form a continuous rectangular shaped channel. Here it should be appreciated that the storage pockets 44 may be oriented or arranged in substantially any manner in the reinforcement section 26. Further, it should be appreciated that the reinforcement section 26 may include clips or other means (not shown) to hold the legs 42 instead of the illustrated pockets 44. All such alternative embodiments are considered to comprise the multifunction tonneau cover 10.

Figure 8:
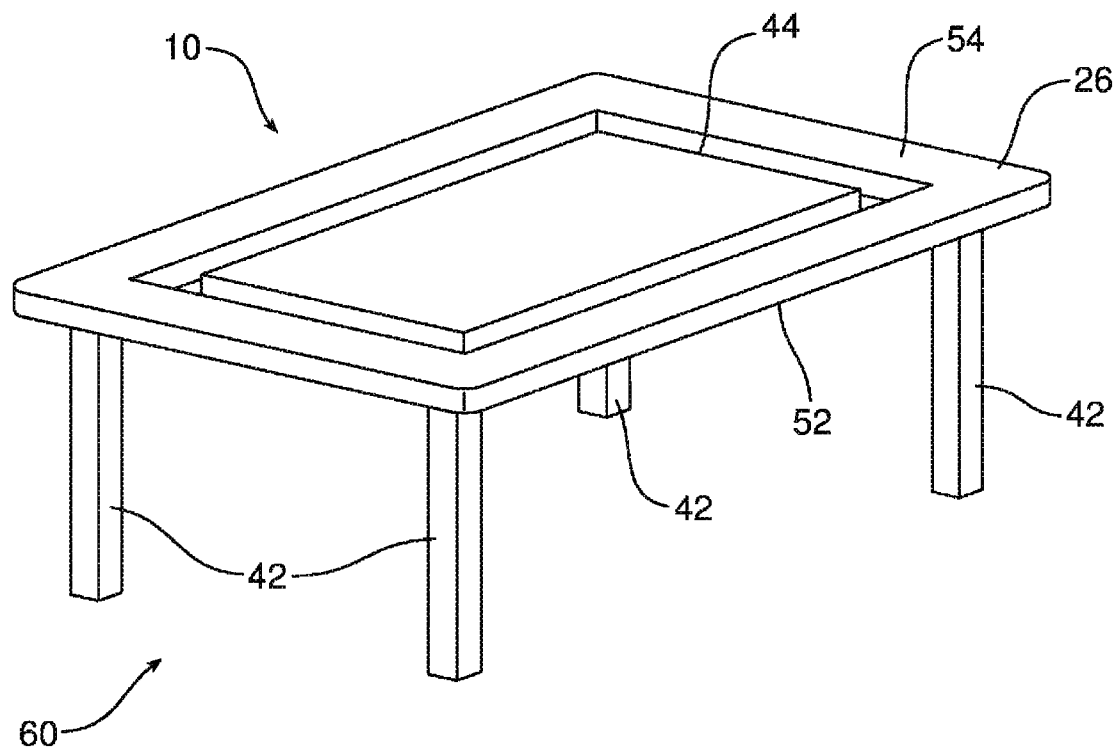
FIG. 8 is a perspective view illustrating the tonneau cover used in a second mode of operation as a work table.

It is a simple matter to convert the multifunction tonneau cover 10 from utilization in the first mode of operation as a load bed cover (see FIGS. 1 and 2) to utilization in a second mode of operation as a table (see FIG. 8). This is done by first disconnecting the body 22 of the multifunction tonneau cover 10 from the pickup truck 14. Toward this end, one removes the ball connector 46 at the distal end of the each gas strut 18 from the receiving socket 48 formed in or carried on the reinforcement section 26 of the body 22. In addition, the body 22 is disconnected from the truck at the hinge assembly 16. This may be done by removing the hinge pins (not shown).

Figure 7:
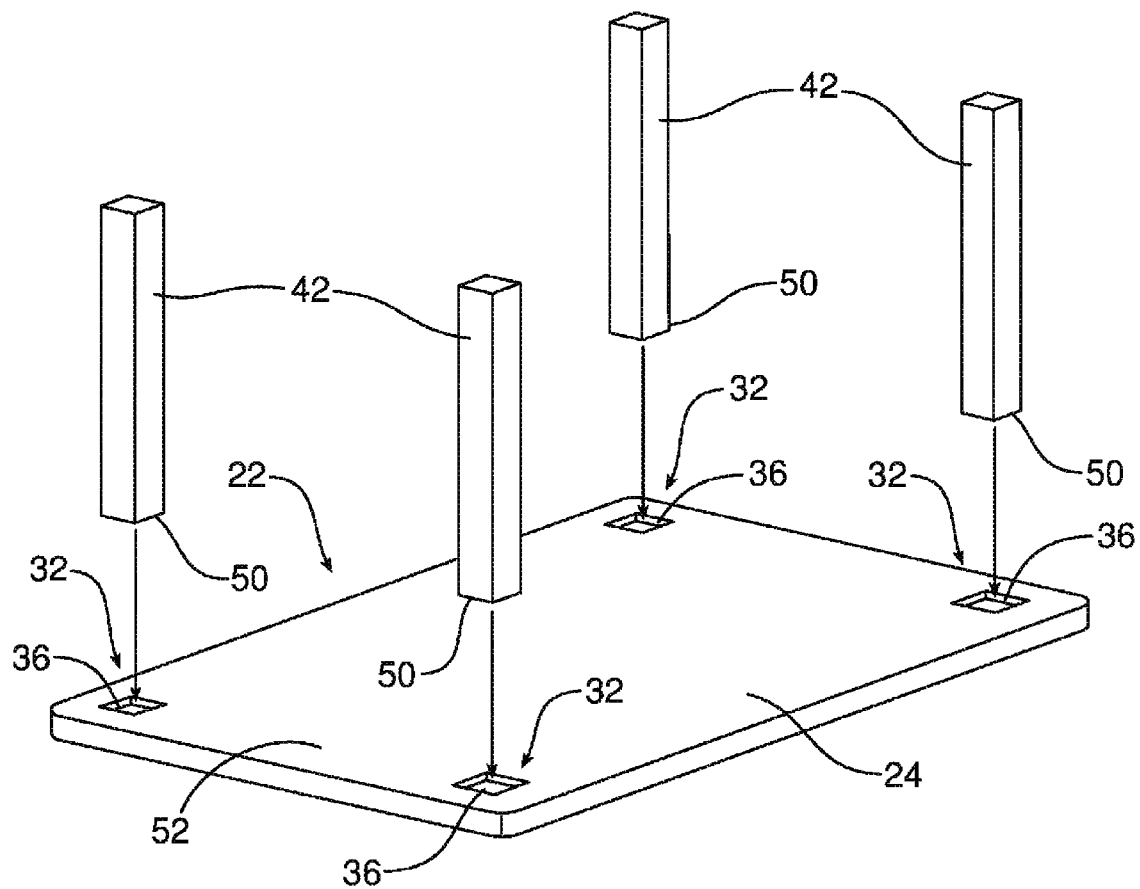
FIG. 7 is an exploded perspective view of the cover showing how the four legs are inserted into the four receivers provided in the front face of the tonneau cover.

One also removes the legs 42 from the storage pockets 44 and the caps 34 from the receivers 32. The tapered ends 50 of the legs 42 are then inserted into the receivers 32 until friction fit engagement is achieved (see FIG. 7). The body 22 of the tonneau cover 10 is then flipped over so that the body is supported on the legs 42 to function as a table 60 as illustrated in FIG. 8.

Here it should be appreciated that the first or front face 52 of the body 22 that is oriented upward to provide an aesthetically pleasing appearance matching the pickup truck 14 when used in the first mode of operation as a load bed cover is oriented downward when the cover is used in the second mode of operation as a table. Thus, if one scratches the table face of the body 22, that scratch is made on the lower or reverse face 54 of the body formed by the reinforcement section 24 thereby preserving the look and finish of the front face 52.

When one no longer needs the work table 60, it is a simple matter to convert the multifunction tonneau 10 cover back to its first mode of operation as a load bed cover. More specifically the table 60 is turned over and the legs 42 are removed from the receivers 32 and stowed again in the storage pockets 44. The caps 34 are then again installed on the raised flanges 38 surrounding the receivers 32 thereby closing and sealing the receivers 32. Next, the body 22 is lifted and positioned onto the pickup truck 14 over the load bed 12. Toward this end the body is reconnected at the hinge assembly 16 and the ball connectors 46 of the gas struts are again connected to the receiving sockets 48 on the reinforcement section 26 of the body 22. The multifunction tonneau cover 10 may then be pivoted about the hinge assembly 16 into the closed position illustrated in FIG. 2. The latching mechanism 20 latches to secure the multifunction tonneau cover in place.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A multifunction tonneau cover for a load bed of a truck, comprising:
   a body including a plurality of leg receivers;
   a plurality of caps closing said plurality of leg receivers in a first mode of operation as a load bed cover; and
   a plurality of legs received and held in said plurality of leg receivers in a second mode of operation as a table wherein said body includes a first face oriented upward in said first mode of operation and a second face oriented upward in said second mode of operation, wherein each leg receiver of said plurality of leg receivers includes a raised flange surrounding an opening, wherein each opening forms a socket having a closed end.

2. The multifunction tonneau cover of claim 1, wherein said first face is opposite said second face.

3. The multifunction tonneau cover of claim 2, further including a plurality of storage pockets wherein said plurality of legs are received and held in said plurality of storage pockets in said first mode of operation.

4. The multifunction tonneau cover of claim 3, wherein said plurality of storage pockets are provided in said second face.

5. The multifunction tonneau cover of claim 4, wherein said body includes a cover section and a reinforcement section.

6. The multifunction tonneau cover of claim 5, wherein said cover section includes a recessed wall forming a cavity and said reinforcement section nests within said cavity.

7. The multifunction tonneau cover of claim 6, wherein said cover section defines said first face and said reinforcement section defines said second face.

8. The multifunction tonneau cover of claim 7, wherein said reinforcement section includes at least one reinforcement rib.

9. The multifunction tonneau cover of claim 8, wherein each leg of said plurality of legs includes an end that friction fits in one leg receiver of said plurality of leg receivers.

10. The multifunction tonneau cover of claim 9, wherein each cap of said plurality of caps is made from a resilient material sized and shaped to plug one leg receiver of said plurality of leg receivers.

11. The multifunction tonneau cover of claim 10, wherein each cap of said plurality of caps includes a channel for receiving and sealing against said raised flange.

12. The multifunction tonneau cover of claim 11, further including at least one gas strut for supporting said multifunction tonneau cover in an open position on said truck.

13. The multifunction tonneau cover of claim 12, wherein said at least one gas strut includes a ball connector and said body includes a socket for releasably receiving said ball connector.

14. The multifunction tonneau cover of claim 13, wherein said socket is provided in said reinforcement section.

15. The multifunction tonneau cover of claim 14, including a hinge assembly pivotally connecting said tonneau cover to said truck.

* * * * *